United States Patent
Ishikawa et al.

(10) Patent No.: US 6,803,445 B2
(45) Date of Patent: Oct. 12, 2004

(54) MOISTURE CURABLE POLYURETHANE AND/OR EPOXY RESIN COMPOSITION AND STORAGE STABILIZER CONTAINED THEREIN

(75) Inventors: Kazunori Ishikawa, Kanagawa (JP); Hiroyuki Hosoda, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/212,074

(22) Filed: Aug. 6, 2002

(65) Prior Publication Data

US 2003/0130411 A1 Jul. 10, 2003

(30) Foreign Application Priority Data

Aug. 8, 2001 (JP) ......................................... 2001-240330

(51) Int. Cl.$^7$ .............................................. C08G 59/02
(52) U.S. Cl. ....................... 528/408; 556/411; 525/452; 524/265; 524/589; 528/52
(58) Field of Search ......................... 556/411; 525/452, 525/528; 524/265, 589; 528/52, 408

(56) References Cited

U.S. PATENT DOCUMENTS 6,221,978 B1 * 4/2001 Li et al. ..................... 525/452
6,271,333 B1  8/2001 Okuhira

FOREIGN PATENT DOCUMENTS

JP  06-157900  *  6/1994
JP  2001-2753      1/2001

* cited by examiner

Primary Examiner—Kuo-Liang Peng
(74) Attorney, Agent, or Firm—Rader, Fishman & Grauer PLLC

(57) ABSTRACT

A moisture curable polyurethane composition comprising (A) a urethane prepolymer having two or more isocyanate groups in the molecule, (B) an inorganic filler as a storage stabilizer, (C) an N-silylamide compound represented by the formula (1), (D) an epoxy resin, and/or (E) a moisture latent curing agent, and a moisture curable epoxy resin composition comprising (D) an epoxy resin, (C) an N-silylamide compound, and (E) a moisture latent curing agent.

$$(R^1-CONH)_{4-n}-Si-R^2_n \quad (1)$$

wherein $R^1$ is a hydrocarbon group having 5 to 21 carbon atoms optionally containing a heteroatom, provided that when n is 0, 1 or 2, $R^1$s may be the same or different; and $R^2$ is an alkyl or alkoxy group having 1 to 3 carbon atoms; and n is 0, 1, 2 or 3.

The moisture curable compositions are excellent in storage stability and thixotropic properties, have high curing rates at the time of working, and can give rise to cured products having excellent mechanical properties such as tensile strength.

4 Claims, No Drawings

MOISTURE CURABLE POLYURETHANE AND/OR EPOXY RESIN COMPOSITION AND STORAGE STABILIZER CONTAINED THEREIN

BACKGROUND OF THE INVENTION

1. Field of the Invention

The present invention relates to a moisture curable polyurethane and/or epoxy resin composition suitable for use as a joint filling material, sealant or adhesive, or the like, and storage stabilizer to be contained in such a moisture curable polyurethane and/or epoxy resin composition.

2. Description of the Related Art

Isocyanate compounds having two or more isocyanate groups in the molecule form three-dimensional crosslinked structures due to the reaction with curing agents such as amines and polyols to provide polyurethane cured products which are excellent in high strength, high elongation, abrasion resistance, grease resistance, etc. Presence of a repeating unit having an ether skeleton in the main chains of such isocyanate compounds can give rise to flexible cured products. Polyurethane compositions comprising such urethane polymers as main integrants have heretofore found wide use as joint filling materials (joint compound), sealants, adhesives, etc. Such urethane polymers having isocyanate groups react with the moisture in the air and cure with decarboxylation, so that they can serve as one-pack type moisture curable polyurethane resins. Using moisture latent curing agents whose active hydrogen is chemically blocked and unblocked by moisture can not only control the curing but also prevent the foaming of the polyurethane resins.

Needless to say, one-pack type moisture curable polyurethane compositions have considerably improved workability and are more useful than two-pack type polyurethane compositions, of which the main ingredient and the curing agent are mixed at the time of working.

Incidentally, in the case where the moisture curable polyurethane compositions are used in particular as sealants, joint filling materials, etc., the property of good workability without causing sagging, in other words thixotropic properties (slump resistance) are required. The thixotropic properties can usually be improved by blending colloidal silica, etc., in the polyurethane compositions with using calcium carbonate as a filler having smaller surface area.

Calcium carbonate is known to include usually two types, i.e., heavy (having larger particle size about 1 $\mu$m or more than 1 $\mu$m as the mean diameter such as ground calcium carbonate, ground limestone, ground whiting) and light (having smaller particle size about 0.1 $\mu$m or less than 0.1 $\mu$m as the mean diameter such as colloidal calcium carbonate or precipitated calcium carbonate). The heavy calcium carbonate is used in combination with precipitated calcium carbonate such as colloidal silica to provide thixotropic one-pack type moisture curable polyurethane compositions, as described above. On the other hand, general light calcium carbonate is poor in storage stability and not used in one-pack type moisture curable polyurethane compositions due to the difficulty of elimination of water.

For this reason, where the light calcium carbonate, which has a larger surface area, is used in the one-pack type moisture curable polyurethane compositions, it is necessary to surface-treat the above-mentioned calcium carbonate with fatty acid esters (JP 2,652,044 B) or urethane compounds (JP 10-245221 A) in order to attain storage stability. The surface treatment can provide one-pack type moisture curable polyurethane compositions having thixotropic properties. However, using such calcium carbonates do not always give high storage stability. The addition of the above-mentioned colloidal silica has inherent problems that foaming and generation of cracks at the time of curing and too high a modulus of the cured product.

Under the circumstances, the inventors of the present invention have previously proposed blending a polyurethane composition containing calcium carbonated surface-treated with a fatty acid ester with a fatty acid silyl ester (JP 2,719,105 B) or with a polysiloxane having a fatty acid silyl ester group (JP 2,749,763 B) to improve storage stability. In particular, the polyurethane composition blended with the fatty acid silyl ester permit blending light calcium carbonate, so that thixotropic properties and storage stability can be imparted thereto.

On the other hand, in the case of a one-pack type epoxy resin containing a ketimine or an oxazolidine as a latent curing agent, storage stability is a big problem. To cope with this problem, the publication of WO98/31722 discloses the utilization of latent curing agents with steric hindrance. Although these latent curing agents exhibit excellent storage stability, they are not always satisfactory.

SUMMARY OF THE INVENTION

The inventors of the present invention have found that although fatty acid silyl ester groups are effective to both thixotropic properties and storage stability, in some situations they are hydrolyzed to produce free carboxylic acids (fatty acids), that is, since the fatty acid silyl ester groups have higher hydrolyzability than that of an isocyanate group, they are hydrolyzed with the moisture inherently contained in calcium carbonate, etc. used as a filler during its storage, thereby producing free carboxylic acids, which promote the hydrolysis of the latent curing agent, particularly the oxazolidines and the ketimines to decrease the storage stability of the resin compositions.

Therefore, emergence of a storage stabilizer is desired that can provide more improved storage stability of thixotropic moisture curable polyurethane compositions, in particular those containing inorganic fillers than that of the currently used curable polyurethane composition, and a thixotropic moisture curable polyurethane composition containing such a storage stabilizer and capable of providing cured products having not only excellent storage stability but also excellent thixotropic properties, high curing rates at the time of working and excellent mechanical characteristics such as elongation.

Furthermore, also in the case of a one-pack type epoxy resin, the latent curing agent is activated with a carboxylic acid to be released to decrease storage stability, and in addition the epoxy resin is also activated by the carboxylic acid to be released, which is also a cause of decreasing the storage stability. Accordingly, emergence of a storage stabilizer is desired that can provide more improved storage stability of epoxy resin compositions, in particular those containing inorganic fillers than that of the currently used epoxy resin composition, and an one-pack type epoxy resin composition containing the storage stabilizer and capable of providing cured products having not only excellent storage stability but also high curing rates at the time of working and excellent mechanical characteristics.

The above-mentioned object can be solved by the following aspects of the present invention.

Thus, the present invention relates to a storage stabilizer for polyurethanes and/or epoxy resins comprising an N-silylamide compound having a functional group represented by the formula: —CONH—Si≡.

Also, the present invention relates to a storage stabilizer for moisture curable polyurethanes and/or epoxy resins comprising an N-silylamide compound represented by the formula (1):

$$(R^1\text{—CONH})_{4-n}\text{—Si—}R^2{}_n \qquad (1)$$

wherein $R^1$ is a hydrocarbon group having 5 to 21 carbon atoms optionally containing a heteroatom, and $R^2$ is an alkyl or alkoxy group having 1 to 3 carbon atoms; and n is 0, 1, 2 or 3; provided that $R^1$s and $R^2$s may be the same or different.

Also, the present invention relates to a moisture curable polyurethane composition comprising (A) a urethane prepolymer having two or more isocyanate groups in the molecule, (B) 1 to 300 parts by weight per 100 parts by weight of the urethane prepolymer (A) of an inorganic filler, (C) 0.5 to 30 parts by weight per 100 parts by weight of the urethane prepolymer (A) of an N-silylamide compound represented by the formula (1), and (E) a moisture latent curing agent.

$$(R^1\text{—CONH})_{4-n}\text{—Si—}R^2{}_n \qquad (1)$$

wherein $R^1$ is a hydrocarbon group having 5 to 21 carbon atoms optionally containing a heteroatom, and $R^2$ is an alkyl or alkoxy group having 1 to 3 carbon atoms; and n is 0, 1, 2 or 3; provided that $R^1$s and $R^2$s may be the same or different.

Also, the present invention relates to a moisture curable epoxy resin composition comprising (D) an epoxy resin (prepolymer), (B) 1 to 300 parts by weight per 100 parts by weight of an epoxy resin (D) of an inorganic filler, (C) 0.5 to 30 parts by weight per 100 parts by weight (D) of the epoxy resin of an N-silylamide compound represented by the formula (1), and (E) a moisture latent curing agent.

$$(R^1\text{—CONH})_{4-n}\text{—Si—}R^2{}_n \qquad (1)$$

wherein $R^1$ is a hydrocarbon group having 5 to 21 carbon atoms optionally containing a heteroatom, and $R^2$ is an alkyl or alkoxy group having 1 to 3 carbon atoms; and n is 0, 1, 2 or 3; provided that $R^1$s and $R^2$s may be the same or different.

Also, the present invention relates to a moisture curable polyurethane composition comprising (A) a urethane prepolymer having two or more isocyanate groups in the molecule, (D) 1 to 100 parts by weight per 100 parts by weight of the urethane prepolymer (A) of an epoxy resin, (B) 1 to 300 parts by weight per 100 parts by weight of the urethane prepolymer (A) of an inorganic filler, (C) 0.5 to 30 parts by weight per 100 parts by weight of the urethane prepolymer (A) of an N-silylamide compound represented by the formula (1), and (E) a moisture latent curing agent.

$$(R^1\text{—CONH})_{4-n}\text{—Si—}R^2{}_n \qquad (1)$$

wherein $R^1$ is a hydrocarbon group having 5 to 21 carbon atoms optionally containing a heteroatom, and $R^2$ is an alkyl or alkoxy group having 1 to 3 carbon atoms; and n is 0, 1, 2 or 3; provided that $R^1$s and $R^2$s may be the same or different.

The present invention relates to any one of above-mentioned moisture curable polyurethane compositions, in which the moisture latent curing agent is selected from the group consisting of oxazolidine, a ketimine, an enamine and a silyl mercaptan, is in an amount of 0.1 to 30 parts by weight per 100 parts by weight of the urethane prepolymer (A) or the epoxy resin.

Also, the present invention provides a sealant or adhesive comprising either one of the above-mentioned moisture curable polyurethane and/or epoxy resin composition. Further the present invention includes a cured product thereof.

DETAILED DESCRIPTION OF THE INVENTION

Next, the moisture curable polyurethane resin composition and/or epoxy resin composition (hereinafter, also simply referred to as polyurethane composition), the storage stabilizer contained in the composition and the applications of the compositions of the present invention will be described in detail.

The moisture curable polyurethane composition according to a first aspect of the present invention is a moisture curable polyurethane composition composed of (A) a urethane prepolymer, (B) an inorganic filler, and (C) an N-silylamide compound, and is excellent in mechanical characteristics such as tensile strength, high in curing rate, storage stability (shelf life stability), has thixotropic properties and is accompanied by no great change in the curing rate and the thixotropic properties even after the storage. Further blending (E) a moisture latent curing agent can give rise to a one-pack type moisture curable polyurethane composition showing no foaming and having excellent curability.

The polyurethane composition contains 1 to 300 parts by weight, preferably 10 to 250 parts by weight of the inorganic filler (B) and 0.5 to 30 parts by weight, preferably 1 to 20 parts by weight of the N-silylamide compound (C), per 100 parts by weight of the urethane prepolymer (A). Also, it contains 0.3 to 20 parts by weight, preferably 0.5 to 10 parts by weight of the moisture latent curing agent (E) per 100 parts by weight of the urethane prepolymer (A).

The one-pack type moisture curable epoxy resin composition according to a second aspect of the present invention is a moisture curable polyurethane composition composed of (D) an epoxy resin, (C) an N-silylamide compound, and (E) a moisture latent curing agent that generates a mercapto group or an amino group, and is excellent in mechanical characteristics such as tensile strength, high in curing rate, has thixotropic properties and is accompanied by no great change in the curing rate and the thixotropic properties even after the storage.

Although the conventional one-pack type moisture curable epoxy resin compositions using ketimines have a big problem in the storage stability, the epoxy resin composition according to the second aspect of the present invention have been able to well overcome the problem.

The epoxy resin composition contains 0.5 to 30 parts by weight, preferably 1 to 20 parts by weight of the N-silylamide compound (C) and 0.3 to 20 parts by weight, preferably 0.5 to 20 parts by weight of the moisture latent curing agent (E), per 100 parts by weight of the epoxy resin (D).

The moisture curable polyurethane composition according to a third aspect of the present invention is a moisture curable polyurethane composition composed of (A) a urethane prepolymer, (B) an inorganic filler, (C) an N-silylamide compound, and (D) an epoxy resin, and is excellent in mechanical characteristics such as tensile strength, excellent in adhesive property, high in curing rate, has thixotropic properties and is excellent in storage stability, as well as is accompanied by no great change in the curing rate and the thixotropic properties even after the storage.

In the third aspect, the flexibility, the compression strength, the tensile strength, and the like, of the urethane cured product can be attained even if the epoxy resin (D) is used in a larger amount than that of the urethane prepolymer (A). The blending amount of the epoxy resin may be determined appropriately depending on the curing rate of the resultant composition and, the hardness, the compression and the tensile strength of the composition after curing, etc., but usually, it is desirable that the epoxy resin (D) is in a proportion of 1 to 100 parts by weight, preferably 1 to 50 parts by weight per 100 parts by weight of the urethane prepolymer (A). In particular, in the case of use for a sealant, a joint sealing material, or the like, the epoxy resin (D) is in a proportion of 1 to 50 parts by weight, preferably 1 to 30 parts by weight per 100 parts by weight of the urethane prepolymer (A). The components other than the epoxy resin (D) are the same as in the above-mentioned first aspect.

Next, the urethane prepolymer, the main ingredient of the polyurethane composition will be described.

(A) Urethane Prepolymer

In the present invention, any one of a wide variety of usual urethane prepolymers that can be used as a main ingredient at the time of preparing polyurethanes may be used so far as it has two or more isocyanate groups (NCO groups) in the molecule. The urethane prepolymer can be produced usually by a reaction between a polyol compound and an excess amount of a polyisocyanate compound (i.e., NCO group in an equimolar amount or more to hydroxyl group (OH group)).

The above-mentioned polyol compound is not particularly limited so far as it has two or more hydroxyl groups in the molecule and examples thereof include polyether polyols, polyester polyols, low molecular weight polyols and other polyols.

The polyether polyols include those obtained by addition polymerization of one or more alkylene oxides selected from propylene oxide, ethylene oxide, butylene oxide, styrene oxide, and the like, to one or more low molecular weight polyols.

Examples of the low molecular weight polyols include: polyhydric alcohols such as ethylene glycol, diethylene glycol, propylene glycol, dipropylene glycol, 1,3-butanediol, 1,4-butanediol, pentanediol, neopentyl glycol, hexanediol, cyclohexanedimethanol, glycerin, 1,1,1-trimethylolpropane, 1,2,5-hexanetriol, sorbitol, and pentaerythritol; resorcin, dihydroxystyrene; and aromatic diols having a bisphenol skeleton, such as 4,4'-dihydroxyphenylpropane (bisphenol A), 4,4'-dihydroxyphenylmethane (bisphenol F), brominated bisphenol A, bisphenol S, and bisphenol AFs; and hydrogenated products thereof, etc.

Specific polyether polyols include polyoxypropylene glycol (PPG), polytetramethylene ether glycol (PTMEG), polyethylene glycol (PEG), polyoxypropylenetriol, ethylene oxide/propylene oxide block copolymers, sorbitol polyols, polyether polyols obtained from a diol having a bisphenol skeleton and an alkylene oxide, for example a polyether polyol containing the above-mentioned bisphenol A unit and an ethylene oxide or propylene oxide unit, etc.

The polyester polyols include: condensation polymers of one or more of the above-mentioned low molecular weight polyols and one or more acids selected from hydroxycarboxylic acids such as glutaric acid, adipic acid, azelaic acid, maleic acid, fumaric acid, pimelic acid, suberic acid, sebacic acid, terephthalic acid, isophthalic acid, pyromellitic acid, dimeric acid, oligomeric acid, castor oil, reaction products of castor oil with ethylene glycol/propylene glycol; ring opening polymer of propiolactone, valerolactone, caprolactone, etc. having two hydroxyl groups at the terminals thereof.

The polyester polyols include, for example, polyester polyols obtained from bisphenol A and castor oil; polyester polyols having a bisphenol skeleton obtained from bisphenol A, castor oil and ethylene glycol or propylene glycol, etc.

Furthermore, polymer polyols having a carbon-carbon bond in the main chain skeleton thereof such as acrylic polyols, polybutadiene polyols, and hydrogenated polybutadiene polyols, the above-mentioned low molecular weight polyols, etc. can be used. As the acrylic polyols, the acrylic polyols synthesized by special continuous bulk polymerization as disclosed in JP 60-215007 A may be advantageously exemplified.

Among the above-mentioned polyols, preferred as starting material polyols for urethane prepolymers are polyether polyols having a number average molecular weight of 1,000 to 15,000, particularly 1,000 to 10,000, from the viewpoint of physical property for a sealant of the composition after curing.

The starting material polyols for urethane prepolymers may be combinations of two or more of the above-mentioned polyol compounds.

The polyisocyanate compound as a starting material for urethane prepolymers is not particularly limited so far as it has two or more isocyanate groups in the molecule. Specifically, suitable examples thereof include: aromatic polyisocyanates such as 2,4-tolylene diisocyanate, 2,6-tolylene diisocyanate, phenylene diisocyanate, diphenylmethane-4,4'-diisocyanate, naphthalene-1,5-diisocyanate, and triphenylmethane triisocyanate and hydrogenated compounds thereof; aliphatic polyisocyanates such as ethylene diisocyanate, propylene diisocyanate, tetramethylene diisocyanate, and hexamethylene diisocyanate; alicyclic polyisocyanates such as isophorone diisocyanate; and aromatic ring-containing polyisocyanates such as xylylene diisocyanate, and metatetramethylxylylene diisocyanate.

The combinations of two or more of the above-mentioned diisocyanates may also be used.

The production method for the urethane prepolymer is not particularly limited so far as it finally contains two or more free isocyanate groups in the molecule. Usually, it can be produced by reacting the above-mentioned polyol compound with an excess amount of the polyisocyanate compound. The polyol compound and polyisocyanate compound are used such that the ratio of the isocyanate group (NCO) in the polyisocyanate compound to the hydroxyl group (OH) in the polyol compound (NCO/OH) is usually 1.2 to 5.0, and preferably 1.5 to 2.4 for sealant applications. Using the reactants in such a ratio can provide urethane prepolymers having suitable viscosities and good workability.

For example, the production of the urethane prepolymer may be performed by stirring the polyol and the polyisocyanate in such a ratio with heating at 50 to 100° C. At the time of reaction, catalysts for urethanitation such as organotin compounds, organobismuth compounds and tertiary amines may be used if necessary.

The urethane prepolymer used in the present invention contains two or more molecular terminals composed of free isocyanate groups. The NCO number herein refers to an average number per molecule. It is preferred that the NCO number per molecule of the urethane prepolymer is 2.2 or more. The NCO number, when expressed in terms of mass %, is preferably 0.4 wt % or more, and more preferably 0.5 wt % or more.

The polyurethane composition of the present invention may contain two or more urethane prepolymers.

(B) Inorganic Filler

In the present invention, the inorganic filler used in the polyurethane and/or epoxy resin composition is not particularly limited and may be selected appropriately depending on the purposes and applications.

Specific examples of the inorganic filler include calcium carbonate, colloidal silica, silicic anhydride, diatomaceous earth, carbon black, white carbon, clay, talc, titanium oxide, calcined lime, kaolin, zeolite, etc. In particular, calcium carbonate is suitably used.

As the calcium carbonate, light calcium carbonate is mainly used when high thixotropic properties are required. In this case, calcium carbonate surface-treated with a fatty acid ester, a urethane compound or the like is preferably used. To adjust the workability and physical properties of the cured product, etc., heavy calcium carbonate may also be used in combination. Where no high thixotropic property is required, heavy calcium carbonate is mainly used.

To obtain desired thixotropic properties, the inorganic filler is used in proportions, usually 1 to 300 parts by weight, preferably 10 to 250 parts by weights, per 100 parts by weight of the urethane prepolymer (A). If the amount of the inorganic filler becomes too large exceeding the above-mentioned range, the viscosity of the resultant composition increases too much to show a tendency of a decreased workability.

(C) N-silylamide Compound

The polyurethane and/or epoxy resin composition of the present invention contains an N-silylamide compound having a functional group represented by the formula —CONH—Si≡. That is, the polyurethane and/or epoxy resin composition of the present invention contains an N-silylamide compound represented by the formula (1):

$(R^1—CONH)_{4-n}—Si—R^2_n$       (1)

In the formula (1) above, $R^1$ is a hydrocarbon group having 5 to 21 carbon atoms, preferably 11 to 20 carbon atoms, and the hydrocarbon group may contain a heteroatom such as oxygen, and sulfur. $R^2$ is an alkyl or alkoxy group having 1 to 3 carbon atoms. n is 0, 1, 2 or 3. When each $R^1$ or $R^2$ in plural, $R^1$s and $R^2$s may be the same or different.

More specifically, the N-silylamide compound in the present invention contains —CONH—Si≡ and partially hydrolyzed condensates thereof. These N-silylamide compounds are readily hydrolyzed to generate an amide compound (—$CONH_2$ group-containing compound) and a silanol compound (HO—Si≡ group-containing compound), so that they can readily remove the moisture in the moisture curable polyurethane and/or epoxy resin composition. Therefore, it contributes to the improvement of the storage stability of the resin composition. Furthermore, the generated amide compound has a role of improving the thixotropic properties of the composition.

Specific examples of the groups represented by $R^1$ include: alkyl groups such as phenyl, benzyl, hexyl, heptyl, octyl, nonyl, decyl, pentadecyl, undecyl, dodecyl, tridecyl, tetradecyl, pentadecyl, hexadecyl, heptadecyl, octadecyl, nonadecyl, and eicosyl; and acid residues such as oleic acid residue, rinolic acid residue, and rinoleic acid residue. Among these, preferred are phenyl, pentadecyl, heptadecyl, and oleic acid residue.

Specific examples of the groups represented by $R^2$ include methyl, ethyl, propyl, methoxy, ethoxy, and propoxy. Among these, preferred are methyl, ethyl, methoxy and ethoxy.

The synthesis method for the N-silylamide compound is not particularly limited. For example, the N-silylamide compound can be synthesized using a carboxylic acid amide containing an $R^1$ group and a halogenated silane compound represented by the formula: $Si—R^2_nX_{4-n}$ (wherein $R^2$ and n have the same meanings as defined for the formula (1), and X is a halogen).

Examples of the carboxylic acid amide include: amide derivatives of carboxylic acids selected from straight chain saturated fatty acids such as caprylic acid, pelargonic acid, capric acid, undecanoic acid, lauric acid, myristic acid, palmitic acid, stearic acid, arachic acid, behenic acid, lignoceric acid, cerotic acid, montanic acid, and melissic acid; unsaturated fatty acids such as caproleic acid, oleic acid, cetoleic acid, sorbic acid, rinolic acid, and rinoleic acid; aromatic carboxylic acids such as benzoic acid and phenylacetic acid, etc.; and combinations of two or more of them. In particular, the amide compounds of palmitic acid, stearic acid and oleic acid are preferred.

The halogenated silane compounds that can be used include: chlorosilane compounds such as tetrachlorosilane, methyltrichlorosilane, dimethyldichlorosilane, trimethylchlorosilane, vinyltrichlorosilane, 2-chloroethyltrichlorosilane, ethyltrichlorosilane, 2-cyanoethyltrichlorosilane, allyltrichlorosilane, 3-bromopropyltrichlorosilane, methylvinyltrichlorosilane, ethylmethyldichlorosilane, trimethylbromosilane, divinyldichlorosilane, methyl-3,3,3-trifluoropropyldichlorosilane, isobutyltrichlorosilane, pentyltrichlorosilane, phenyltrichlorosilane, methylphenyldichlorosilane, dimethylphenylchlorosilane, cyclohexyltrichlorosilane, benzyltrichlorosilane, p-tolyltrichlorosilane, 6-trichlorosilyl-2-norbornene, 2-trichlorosilylnorbornane, 2-(4-cyclohexenylethyl) trichlorosilane, dodecyltrichlorosilane, tetradecyltrichlorosilane, 1,2-bis(trichlorosilyl)ethane, 1,2-bis(dimethylchlorosilyl)ethane, and 1,4-bis(dimethylchlorosilyl)benzene; chlorosiloxane compounds such as 1,1,3,3-tetramethyl-1,3-dichloroiloxane; and combinations of two or more of them. The chlorosilane compounds are preferred.

The N-silylamide compound is synthesized by reacting the above-mentioned carboxylic acid amide with the halogenated silane compound in a solvent having no active hydrogen, such as hexane, heptane, benzene, toluene, xylene, methylene chloride, or chloroform in the presence of a tertiary amine such as triethylamine or pyridine as a dechlorinating agent at a temperature of from room temperature to 100° C.

Also, the N-silylamide compound can be synthesized by heating the above-mentioned carboxylic acid amide and chlorosilane compound at 120 to 180° C. in the absence of dechlorinating agents while removing hydrogen chloride gas being generated. As the catalyst, triethylamine, pyridine, etc. may be used.

Further, among the N-silylamide compounds, those amide compounds to which a trimethylsilyl group, for example, is bonded can be synthesized also by reacting hexamethyldisilazane and an amide compound in the presence of saccharin at 80 to 150° C. while distilling off ammonia being generated.

The N-silylamide compounds of the present invention may be used in combination of two or more of them. Particularly preferred N-silylamide compounds include N-trimethylsilylpalmitic acid amide, N-trimethylsilylstearic acid amide, N-trimethylsilyloleic acid amide, etc.

By blending the N-silylamide compound of the present invention in moisture curable polyurethane and/or epoxy resin composition containing the inorganic filler, the storage stability of the resultant composition can be increased as in the case where the silyl ester is blended therein.

Note that it has not been known that the N-silylamide compound (C) improves the storage stability of moisture curable polyurethane and/or epoxy resin compositions. Accordingly, the present invention also includes applications of the N-silylamide compound (C) as a storage stabilizers for moisture curable polyurethane and/or epoxy resin compositions.

(D) Epoxy Resin

The epoxy resin used in the present invention is not particularly limited so far as it is a polyepoxy compound that has two or more epoxy groups in the molecule. Examples thereof include epoxy resins of the type of glycidyl ether of bisphenol A and derivatives thereof; epoxy resins of the type of glycidyl ether of glycerin, epoxy resins of the type of glycidyl ether of polyalkylene oxide; epoxy resins of the type of glycidyl ether of phenol novolak; epoxy resins of the type of glycidyl ether of dimeric acid, epoxy resins of the type of glycidyl ether of bisphenol F; and modified resins thereof, etc. Among them, epoxy resins of the type of glycidyl ether of bisphenol A and modified resins thereof are suitably used. In the case of epoxy resins of the type of glycidyl ether of bisphenol A, they may be either of liquid, semi-solid and solid forms, having an average degree of polymerization of 1 to 20.

The effect of blending the epoxy resins in the polyurethane compositions is as described above.

(E) Moisture Latent Curing Agent

The polyurethane composition of the present invention can cure usually without using any curing agent. However, in order to increase the curing rate and prevent the foaming thereof, a moisture latent curing agent may be used in some cases. The moisture latent curing agent is used without any particular limitation so far as it is generally contained in one-pack type moisture curable polyurethane compositions. Moisture latent curing agents that are substantially inactive in the absence of moisture but generate a primary amino group, a secondary amino group or a thiol group by contact with moisture (hydrolysis) are preferred. Those moisture latent curing agents that have one or more structures of oxazolidines, ketimines, enamines and silylmercaptanes may be used without any particular limitation. Specifically, oxazolidines, ketimines (inclusive of aldimines), enamines and silylmercaptanes are preferably used.

The epoxy resin composition of the present invention like polyurethanes can cure usually with a moisture latent curing agent. As the moisture latent curing agent, one similar to that used in the case the polyurethanes are used. Moisture latent curing agents which generates a mercapto group or an amino group are preferred. Specifically, oxazolidines, ketimines (inclusive of aldimines), enamines and silylmercaptanes are preferably used.

Oxazolidines are just required to be a moisture latent curable compound having an oxazolidine ring, and those oxazolidines disclosed in JP 55-35407 B, JP 58-5913 B, JP 7-33853 A, JP 6-293821 A, JP 9-278857 A, JP 2001-152080 A, etc. may be used. Specific examples thereof include oxazolidine compounds represented by the following formula (2) and derivatives thereof.

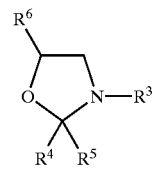

(2)

In the formula (2) above, $R^3$ represents a lower alkyl group such as a methyl group or an ethyl group, etc. $R^4$ and $R^5$ independently represent an aliphatic hydrocarbon group having 1 to 6 carbon atoms, or an aromatic hydrocarbon group having 6 to 8 carbon atoms, which hydrocarbon groups may contain a heteroatom. Specific examples thereof include a methyl group, an ethyl group, a propyl group, an isobutyl group, an isopentyl group, a phenyl group, a 2,4-dimethylphenyl group, a p-methoxyphenyl group, etc. Furthermore, $R^4$ and $R^5$ may be taken together to form an alicyclic hydrocarbon group having 6 to 8 carbon atoms. $R^6$ represents a hydrogen atom, a methyl group or an alkylene group having a hydroxyl group.

Hereinafter, some examples of suitable oxazolidines are listed.

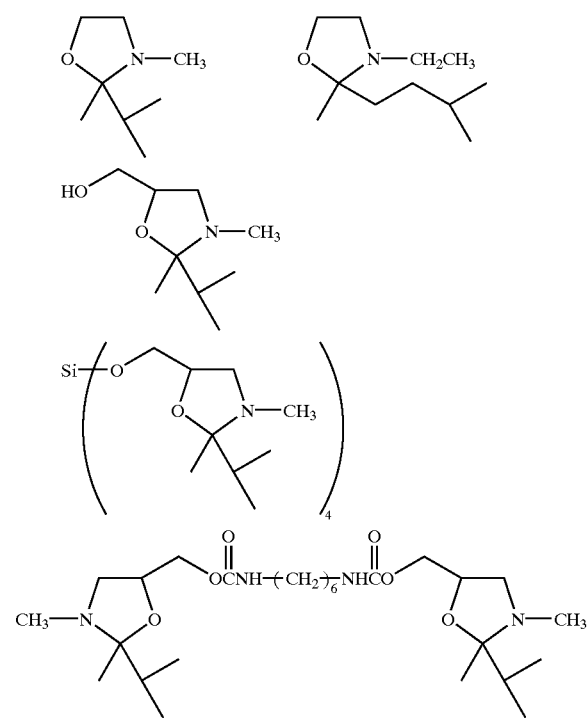

Ketimines (or aldimines) are just required to be moisture latent curable compounds which are obtained by reaction between ketones (or aldehydes) and amines and which have an imino (=C=N—), bond and those ketimines (or aldimines) disclosed in JP 2001-2753 A, etc. may be used.

Preferred ketimines include those having a structure such that it has an imino (=C=N—) bond derived from ketones (or aldehydes) and amines and has a branching carbon or a ring-member carbon bonded to the α-position of at least one of the carbon atom constituting the imino bond and the nitrogen constituting the bond, that is, those having a bulky group at the α-position of the imino bond. The ring-member carbon herein may be either a carbon that constitutes an aromatic ring or a carbon atom that constitutes an alicyclic ring. In particular, those having a bulky group bonded to the carbon atom that constitutes the imino group and a methylene bonded to the nitrogen that constitutes the imino bond are preferred since one-pack type curable compositions having both excellent storage stability and excellent curabilities (curing rate) can be obtained therewith.

In the present invention, ketimines having a bulky group as described above specifically include (1) ketimines containing two or more imino bonds each having attached thereto the above-mentioned bulky group, (2) silicon-containing ketimines having a bulky group derived from a ketone or an aldehyde at the α-position of the carbon of the imino bond and containing an amine component derived from an aminoalkylalkoxysilane, and polycondensed ketimines thereof.

Among the above-mentioned ketimines (1), those that have a bulky group bonded to the carbon of the imino bond and methylene bonded to the nitrogen of the imino bond are preferred, since they can give rise to one-pack type curable compositions excellent in both storage stability and curability (curing rate).

Suitable examples out of the above-mentioned ketimines (1) include those obtained from methyl isopropyl ketone (MIPK) or methyl t-butyl ketone (MTBK) and Jeffamin EDR148 (registered trademark, commercially available from Sun Technochemicals Co., Ltd.: dimethyleneamine having a polyether skeleton), those obtained from methyl isopropyl ketone (MIPK) or methyl t-butyl ketone (MTBK) and 1,3-bisaminomethylcyclohexane (1,3-BAC), those obtained from methyl isopropyl ketone (MIPK) or methyl t-butyl ketone (MTBK) and dimethyleneamine having a norbornane skeleton (trade name: NBDA) (for example, the ketimine compound used in Examples), those obtained from methyl isopropyl ketone (MIPK) or methyl t-butyl ketone (MTBK) and metaxylylenediamine (MXDA), those obtained from methyl isopropyl ketone (MIPK) or methyl t-butyl ketone (MTBK) and polyamideamine (trade name: X2000), etc.

Of those, in particular, those obtained from MIPK or MTBK and NBDA, and those obtained from MIPK and 1,3-BAC exhibit excellent curabilities. Those obtained from MIPK or MTBK and polyamideamine exhibit excellent adhesive property on wet surfaces.

Preferred aldimines include ones obtained from combinations of pivalaldehyde and norbornanediamine (NBDA), 1,3-bisaminomethylcyclohexane (1,3-BAC), Jeffamin EDR148, or metaxylylenediamine (MXDA); combinations of isobutylaldehyde and norbornanediamine (NBDA), 1,3-bisaminomethylcyclohexane (1,3-BAC), Jeffamin EDR148, or metaxylylenediamine (MXDA); combinations of cyclohexanecarboxyaldehyde and norbornanediamine (NBDA), 1,3-bisaminomethylcyclohexane (1,3-BAC), Jeffamin EDR148, or metaxylylenediamine (MXDA); etc.

The ketimines (2) are silicon-containing ketimines derived from aminoalkoxysilanes. The ketimines (2) are derived from a ketone or an aldehyde having a bulky group at the α-position of the ketone or aldehyde. The form of the bulky group is the same as in the above-mentioned ketimines (1).

Details of the starting materials and production methods for the ketimines (1) and (2), as described above, are described in JP 2001-2753 A, etc.

Enamines are just needed to be moisture latent compounds having an enamine bond. Examples thereof include those disclosed in, for example, JP 7-289989 A, etc.

Silyl mercaptans may be exemplified by those disclosed in, for example, JP 6-271641 A.

Among those described above, oxazolidines and ketimines are preferably used.

It is preferred that the polyurethane composition of the present invention contains the moisture latent curing agent (E) in a proportion of 0.1 to 30 parts by weight, more preferably 1 to 20 parts by weight, per 100 parts by weight of the above-mentioned urethane prepolymer (A) or epoxy resin (D).

All these published and pending patent applications cited this specification are here by expressly incorporated by reference in full.

The moisture curable polyurethane and/or epoxy resin composition of the present invention may further be blended with tackifiers such as terpene resins, phenol resins, terpenephenol resins, rosin resins and xylene resins, and polymers such as silicone and modified silicones (or silyl terminated polyether).

The moisture curable polyurethane and/or epoxy resin composition of the present invention, may further be blended with curing catalysts, crosslinking agents, silane coupling agents, other fillers, plasticizers, solvents, tackifiers, stabilizers, coloring agents, etc., as needed, for the purpose of adjusting the viscosity, physical properties, and the like of the composition.

Examples of the curing catalyst include titanates such as tetrabutyl titanate and tetrapropyl titanate; organotin compounds such as dibutyltin dilaurate, dibutyltin maleate, dibutyltin diacetate, tin octylate, and tin naphthenate; lead octylate, etc.

As the compounds of working Examples of the present invention do not include a curing catalyst, a curing catalyst is not necessary used in the present invention.

However if the compound of the present invention includes a curing catalyst, the content of the curing catalyst is preferably 0.002 to 0.1 part by weight per 100 parts by weight of the above-mentioned resin component (the sum of the urethane polymer (A) and/or epoxy resin (D)). If the content exceeds 0.1 part by weight, the composition tends to have decreased storage stability and an increased thermal deterioration rate.

The moisture curable polyurethane and/or epoxy resin composition of the present invention may further contain silane coupling agents as tackifiers. As the silane coupling agent, a wide variety of silane coupling agents that are commonly used may be used. Examples thereof include epoxy group-containing alkoxysilanes.

The epoxy group-containing alkoxysilanes just need to be compounds that have an epoxy group and a hydrolyzable alkoxysilyl group at the terminals of the molecule.

Among the epoxy group-containing alkoxysilanes, γ-(or 3-)glycidoxypropyltrimethoxysilane is preferably used.

Also, silane coupling agents having no epoxy group, such as chloropropyltrimethoxysilane, vinyltrichlorosilane, trimethoxyvinylsilane, vinyltrimethoxysilane, vinyltris(2-methoxyethoxy)silane, and γ-methacryloxypropyltrimethoxysilane, may be exemplified.

In addition, silane coupling agents with an amino group, such as γ-aminopropyltrimethoxysilane and N-(β-aminoethyl)aminopropylmethyldimethoxysilane, etc., may be exemplified.

Besides the above-mentioned silane coupling agents, methyl silicate, ethyl silicate (specifically, MS51 and MS56, manufactured by Mitsubishi Chemical, Corporation), etc. may be used for improving the adhesive property of the composition.

As the plasticizer, various plasticizers can be used. Examples thereof include phthalates such as dibutyl phthalate, diheptyl phthalate, di(2-ethylhexyl)phthalate, butyl benzyl phthalate, and butylphthalyl butyl glycolate; aliphatic dibasic acid esters such as dioctyl adipate and dioctyl sebacate; esters of polyalkylene glycol such as diethylene glycol dibenzoate and triethylene glycol dibenzoate; phosphates such as tricresyl phosphate and tributyl phosphate; chlorinated paraffins; alkyl diphenyls; hydrocarbon oils such as partially hydrogenated terphenyls; process oils; alkylbenzenes; etc.

It is preferred that the plasticizer is added in an amount of 0 to 50 parts by weight per 100 parts by weight of the urethane prepolymer (A).

Examples of the other additives include vinyl chloride paste resin, glass balloon, vinylidene chloride resin balloon, acrylonitrile/methacrylonitrile resin balloon, and inorganic powder-treated products thereof, etc.

Examples of the solvent include aromatic hydrocarbons such as toluene and xylene; aliphatic hydrocarbons such as hexane, heptane and octane; petroleum solvents ranging from gasoline to kerosene fractions, such as mineral spirit; ketones such as acetone, methyl ethyl ketone and methyl isobutyl ketone; ether esters such as cellosolve acetate and butyl cellosolve acetate; etc.

Examples of the stabilizer include hindered phenol compounds, triazole compounds, etc. Examples of the coloring agent include titanium white, carbon black, red iron oxide, etc.

The moisture curable polyurethane and/or epoxy resin composition of the present invention is curable with moisture and can be used as a two pack type composition in which the urethane prepolymer (A) or epoxy resin (D) constitutes the part of a base resin and a curing agent and/or curing catalyst mainly constitutes the part of a curing agent. In this case, other components may be contained in either one of the part of a base resin or the part of a curing agent. However, it is preferred that the polyurethane and/or epoxy resin composition of the present invention is used as a one-pack type sealing material composition.

The production method for a one-pack type polyurethane and/or epoxy resin composition of the present invention is not particularly limited, and may be performed in the same manner as for usual one pack type polyurethane and/or epoxy resin compositions. However, it is preferred that the production is performed in a state where the respective components have low water contents, and further, in an anhydrous state. Therefore, it is recommendable the composition is produced by sufficiently kneading the components in an anhydrous state by using a stirring apparatus such as a mixer under reduced pressure to uniformly disperse them. To remove the moisture in the composition, it is preferred that the N-silylamide compound of the present invention is added in an early stage of the mixing.

EXAMPLES

Hereinafter, the present invention will be described in detail by Examples. However, the present invention should not be considered to be limited thereto.

Synthesis Example 1
<Synthesis of N-silylamide Compound (1)>

N-trimethylsilyl stearic acid amide was prepared from stearic acid amide and hexamethyldisilazane. The reaction formula is described below.

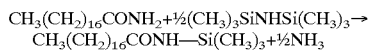

To 800 g of stearic acid amide were added 400 g of toluene and 0.5 g of saccharin and heated at 100° C. for dissolution. To this was added dropwise 260 g of hexamethyldisilazane. After completion of the dropwise addition, the mixture was heated at 130° C. for 4 hours. Thereafter, unreacted hexamethyldisilazane and toluene were distilled off under reduced pressure to obtain 1,003 g of N-trimethylsilyl stearic acid amide.

From the IR spectrum, $^1$H-NMR spectrum and MS spectrum, N-trimethylsilyl stearic acid amide was confirmed to have the following chemical structure.

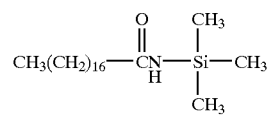

Synthesis Example 2
<Synthesis of N-silylamide Compound (2)>

1,002 g of N-trimethylsilyl oleic acid amide was synthesized in the same manner as in Synthesis Example 1 except that in place of 800 g of the stearic acid amide in Synthesis Example 1 was used 800 g of oleic acid amide.

<Synthesis of Urethane Prepolymer (A)>

100 g of polyoxypropylenediol (average molecular weight 2,000), 800 g of polyoxypropylenetriol (average molecular weight 5,000) and 140 g of metatetramethylxylylene diisocyanate were mixed (NCO/OH=1.8 at this time) and the mixture was stirred at 90° C. in N$_2$ stream and allowed to react to synthesize a urethane prepolymer containing an isocyanate group in an amount of 1.8%.

Examples 1–6 and Comparative Examples 1–3

<Preparation of Polyurethane and/or Epoxy Resin Composition>

The respective components shown below were used in amounts shown in Table 1 and mixed in a universal mixer to prepare a one-pack type polyurethane composition.

(A) As the polyurethane prepolymer, the one synthesized by the above-mentioned method was used.

(B) SEALETS 200 (manufactured by Maruo Calcium Co., Ltd as precipitated calcium carbonate.) was used as calcium carbonate 1, and Super S (manufactured by Maruo Calcium Co., Ltd as ground calcium carbonate.) was used as calcium carbonate 2.

(C) As the N-silylamide compound, the N-trimethylsilyl stearic acid amide or N-trimethylsilyl oleic acid amide synthesized by the above-mentioned method was used. Also, as the silyl ester was used KF-910 (manufactured by Shin-Etsu Chemical Co., Ltd.; viscosity 35 mm$^2$/sec. (60° C.), melting point 45° C.).

(D) As the epoxy resin was used DER332 (manufactured by Dow Chemical Company; epoxy equivalent 173)).

(E) Latent curing agent

As the oxazolidine was used the one represented by the formula (3).

As the ketimine was used the one represented by the formula (4).

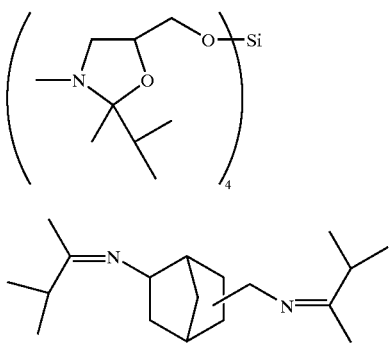

In addition to the above-mentioned components (A) to (E), the following components were blended.

Plasticizer: UP-100 (manufactured by Toagosei Co., Ltd.) was used.

Mineral Spirit: A Solvent (manufactured by Nippon Oil Corporation) was used.

Epoxysilane: A187 (manufactured by Nippon Unicar Co., Ltd.) was used.

The obtained polyurethane and/or epoxy resin composition was evaluated on thixotropic properties, storage stability and mechanical properties as follows.

(1) Thixotropic properties

The initial thixotropy of the polyurethane and/or epoxy resin composition immediately after the composition was prepared was evaluated by thixotropy index. The thixotropy index was obtained from the viscosity at 20° C. as follows. The results are shown in Table 1.

By using a BS type viscometer No. 7 rotor, viscosities (cps) were measured at 20° C. at 1 rpm and 10 rpm, respectively, and the viscosity ratio of 1 rpm/10 rpm was defined as a thixotropy index. Higher thixotropy index shows higher thixotropy.

(2) Curing Time (Tack-free Time)

According to the method described in JIS A 5758, the initial tack-free time of the polyurethane and/or epoxy resin composition immediately after the composition was prepared was measured under the atmosphere of 20° C. and 65% RH. The results obtained are shown in Table 1.

(3) Storage Stability

After storing the polyurethane and/or epoxy resin composition in a sealed vessel at 60° C. for 3 days, the above-mentioned thixotropy index and tack-free time were measured. The results obtained are shown in Table 1.

(4) Elongation (Eb)

The polyurethane and/or epoxy resin composition was left to stand in the atmosphere of 20° C. and 65% RH for 7 days to cure it. The elongation (Eb) of the cured product was measured according to JIS K6251. The results obtained are shown in Table 1.

The polyurethane and/or epoxy resin composition of the present invention shows initial thixotropy and curability and is also excellent in storage stability, as well as it can stably give rise to cured products having excellent mechanical properties such as tensile strength.

The polyurethane and/or epoxy resin composition of the present invention contains an inorganic filler and has good thixotropic property, so that it can be widely used in ordinary applications of flexible polyurethane and/or epoxy resin compositions, such as sealants, joint filling materials, and adhesives. In particular, it is suitable for use as sealants, joint filling materials, etc.

In this case, it can be suitably used as sealants, joint filling materials composed of, in particular, a one-pack type polyurethane and/or epoxy resin composition.

TABLE 1

|  | Comparative Example 1 | Example 1 | Example 2 | Example 3 | Example 4 | Example 5 | Comparative Example 2 | Example 6 | Comparative Example 3 |
|---|---|---|---|---|---|---|---|---|---|
| (A) Urethane prepolymer |  |  |  | 100 |  |  |  | 0 |  |
| (D) Epoxy resin |  | 5 |  | 0 |  | 5 |  | 100 |  |
| (B) Calcium carbonate 1 |  |  |  | 130 |  |  |  | 100 |  |
| Calcium carbonate 2 |  |  |  | 70 |  |  |  | 0 |  |
| (C) Silyl amide (1) | 0 | 3 | 6 | 3 | 6 | 0 | 0 | 6 | 0 |
| Silyl amide (2) | 0 | 0 | 0 | 0 | 0 | 6 | 0 | 0 | 0 |
| Silyl ester | 0 | 0 | 0 | 0 | 0 | 0 | 5 | 0 | 0 |
| (E) Oxazolidine |  | 0 |  | 5 |  |  |  | 0 |  |
| Ketimine |  | 6 |  | 0 |  |  |  | 6 |  |
| Plasticizer |  |  |  | 70 |  |  |  | 0 |  |
| Mineral spirit |  |  |  | 5 |  |  |  | 0 |  |
| Epoxysilane |  |  |  | 2 |  |  |  | 0 |  |
| Thixotropy index |  |  |  |  |  |  |  |  |  |
| Initial thixotropy | 4.4 | 5.3 | 5.7 | 5.5 | 5.7 | 5.6 | 4.9 | — | — |
| After 60° C. × 3 days | 3.8 | 4.9 | 5.1 | 5.1 | 5.2 | 5.3 | 4.2 | 1.1* | 2.8* |
| Tack-free time |  |  |  |  |  |  |  |  |  |
| Initial | 60 | 60 | 60 | 90 | 90 | 90 | 60 | 300 | 300 |
| After 60° C. × 3 days | 40 | 80 | 80 | 110 | 120 | 120 | 40 | 260 | 120 |
| Eb (%) | 620 | 630 | 610 | 680 | 670 | 660 | 615 | — | — |

*Magnification of an increase in viscosity after 60° C. × 3 days.

What is claimed is:

1. A moisture curable epoxy resin composition comprising (D) an epoxy resin, (B) 1 to 300 parts by weight per 100 parts by weight of an epoxy resin (D) of an inorganic filler, (C) 0.5 to 30 parts by weight per 100 parts by weight of the epoxy resin (D) of an N-silylamide compound represented by the formula (1)

$$(R^1-CONH)_{4-n}-Si-R^2_n \tag{1}$$

wherein $R^1$ is a hydrocarbon group having 5 to 21 carbon atoms optionally containing a heteroatom, and $R^2$ is an alkyl or alkoxy group having 1 to 3 carbon atoms; and n is 0, 1, 2 or 3; provided that $R^1$s and $R^2$s may be the same or different, and (E) a moisture latent curing agent.

2. A moisture curable epoxy resin composition according to claim 1, wherein (E) the moisture latent curing agent is selected from the group consisting of an oxazolidine, a ketimine, an enamine, and a silyl mercaptan, is in an amount of 0.1 to 30 parts by weight per 100 parts by weight of the epoxy resin (D).

3. A method for stabilizing a moisture curable epoxy resin during storage comprising mixing an N-silylamide compound having a functional group represented by the formula: —CONH—Si≡ with the epoxy resin.

4. A method for stabilizing a moisture curable epoxy resin during storage according to claim 3, wherein said N-silylamide compound is represented by the formula (1)

$$(R^1\text{—CONH})_{4-n}\text{—Si—}R^2_n \tag{1}$$

wherein $R^1$ is a hydrocarbon group having 5 to 21 carbon atoms optionally containing a heteroatom, and $R^2$ is an alkyl or alkoxy group having 1 to 3 carbon atoms; an n is 0, 1, 2 or 3; provided that $R^1$s and $R^2$s may be the same or different.

* * * * *